(12) United States Patent
Tamanas

(10) Patent No.: US 6,976,899 B1
(45) Date of Patent: Dec. 20, 2005

(54) ALL TERRAIN VEHICLE

(76) Inventor: Kypros Tamanas, 4-5 Cardinal La., Hillsborough, NJ (US) 08876

( * ) Notice: Subject to any disclaimer, the term of this patent is extended or adjusted under 35 U.S.C. 154(b) by 692 days.

(21) Appl. No.: 10/056,518

(22) Filed: Jan. 25, 2002

(51) Int. Cl.[7] .............................................. A63H 33/40
(52) U.S. Cl. ...................... 446/178; 446/236; 446/431; 446/458; 446/460; 446/462; 446/454
(58) Field of Search ................................ 446/236, 431, 446/457, 458, 460, 462, 178, 454; 180/7.4, 180/21, 10, 7.3; 280/205–207; 440/12.5, 440/100; 441/78; 244/2

(56) References Cited

U.S. PATENT DOCUMENTS

| | | | |
|---|---|---|---|
| 1,290,087 A | * | 1/1919 | Christie ......................... 180/21 |
| 1,495,347 A | * | 5/1924 | Neubauer ....................... 180/21 |
| 2,909,145 A | * | 10/1959 | De Hertelendy ............. 180/218 |
| 3,327,801 A | * | 6/1967 | Ezra ............................. 180/21 |
| 3,876,025 A | * | 4/1975 | Green ........................... 180/21 |
| 4,471,567 A | | 9/1984 | Martin ......................... 446/437 |
| 4,505,346 A | * | 3/1985 | Mueller ........................ 180/7.4 |
| 4,579,336 A | * | 4/1986 | Morin .......................... 280/206 |
| 4,729,446 A | * | 3/1988 | Sefton .......................... 180/21 |
| 5,041,051 A | | 8/1991 | Sonesson ..................... 446/456 |
| 5,366,034 A | * | 11/1994 | Meyers ......................... 180/21 |
| 5,439,408 A | | 8/1995 | Wilkinson ................... 446/409 |
| 5,692,946 A | | 12/1997 | Ku .............................. 446/456 |

\* cited by examiner

*Primary Examiner*—Jessica Harrison
*Assistant Examiner*—Bena B. Miller
(74) *Attorney, Agent, or Firm*—Goldstein Law Offices, PC

(57) ABSTRACT

An all terrain vehicle having a casing, a motor assembly, a cradle supporting the propulsion system, and an outer shell. The casing surrounds the propulsion system with three connected rings, each ring capable of independent rotation. The cradle is positioned in the center of the vehicle and is attached to the innermost ring. The outer shell encircles the motor assembly, cradle, and casing, and is constructed from a plurality of vertical and horizontal bars. The vehicle rolls upon the ground while the cradle remains upright. The vehicle may be operated by a remote control or by a person seated within the vehicle.

8 Claims, 5 Drawing Sheets

ALL TERRAIN VEHICLE

BACKGROUND OF THE INVENTION

The invention relates to an all terrain vehicle. In particular, the invention is a vehicle that may be operated by a person or with a remote control over any type of ground surface. The invention generally relates to toys and recreational vehicles that are powered, and capable of movement.

U.S. Pat. No. 5,692,946 to Ku discloses a spherical steering toy. The toy is designed to be controlled to steer on a flat surface through the control of a remote controller.

U.S. Pat. No. 4,471,567 to Martin discloses a two-way operating ball enclosed vehicle. The vehicle is encapsulated in a ball and capable of self-maneuvering to escape obstacles. In particular, the vehicle can maneuver itself out of a corner or from behind furniture or the like.

U.S. Pat. No. 5,041,051 to Sonesson discloses a spheroid shaped toy vehicle with internal radio controlled steering and driving means that may be caused to rotate. This rotation would enable the vehicle to follow any type of tortuous path on the ground.

U.S. Pat. No. 5,439,408 to Wilkinson discloses a remote controlled movable ball amusement device. The device includes a hollow sphere having a propulsion mechanism within the sphere, said mechanism including a receiver and a drive unit.

While these units may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved all terrain vehicle. As such, the general purpose of the present invention, which will be described subsequently in greater detail, is to provide a new and improved all terrain vehicle which has all the advantages of the prior art and none of the disadvantages.

To attain this, the present invention essentially comprises an all terrain vehicle having a casing, a motor assembly, a cradle supporting the propulsion system, and an outer shell. The casing surrounds the propulsion system with three connected rings, each ring capable of independent rotation. The cradle is positioned in the center of the vehicle and is attached to the innermost ring. The outer shell encircles the motor assembly, cradle, and casing, and is constructed from a plurality of vertical and horizontal bars. The vehicle rolls upon the ground while the cradle remains upright. The vehicle may be operated by a remote control or by a person seated within the vehicle.

It is an object of the invention to produce an all terrain vehicle which may be used as a vehicle or operated as a toy. Accordingly, the device may be constructed in a variety of sizes to accommodate the different purposes.

It is a further object of the invention to produce an all terrain vehicle which creates a novel toy for operation on all ground surfaces. Accordingly, the construction of the vehicle allows it to travel over any surface, including grass and cement.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

Figure 1:
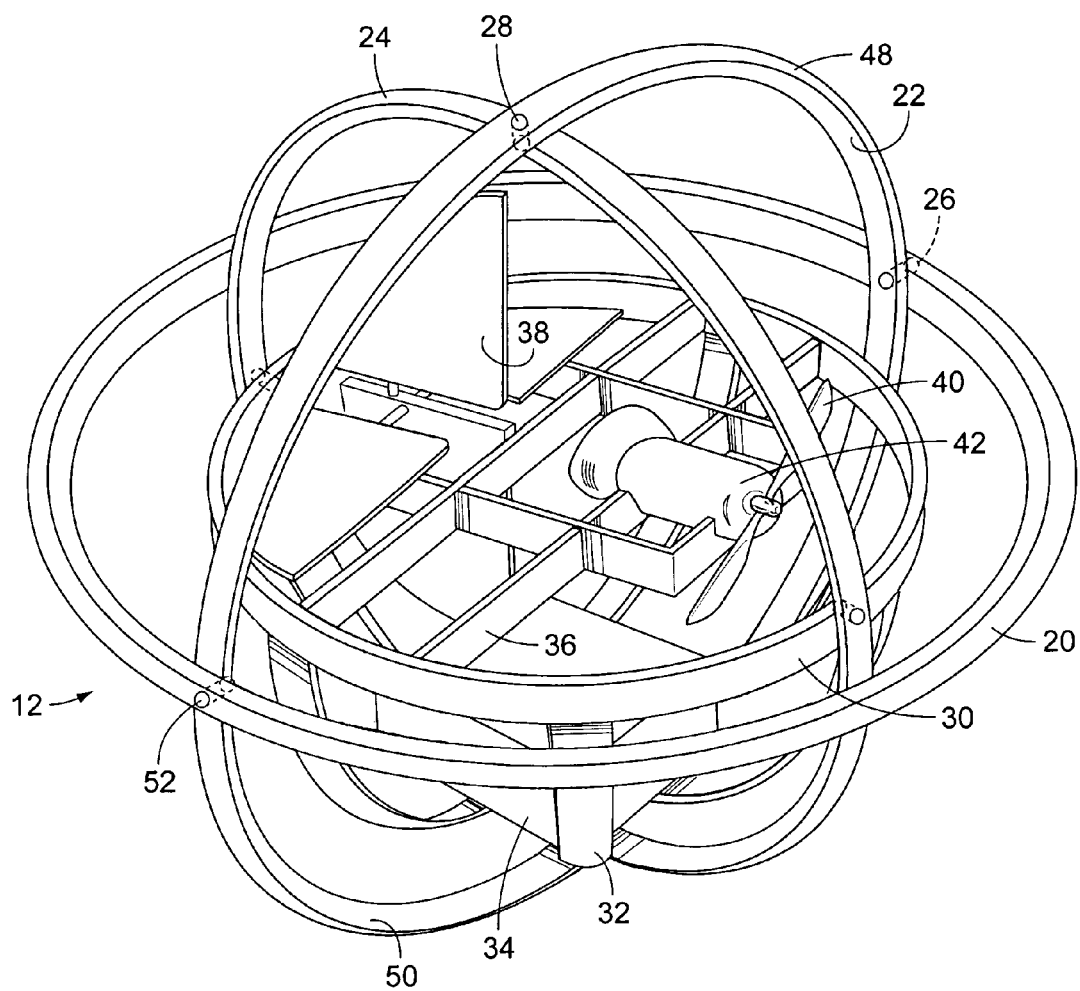
FIG. 1 is a perspective view of the all terrain vehicle, without the outer shell in place.

REFERENCE NUMERALS 10 all terrain vehicle
12 casing
14 propulsion system
16 cradle
16U upper end of cradle
16B bottom portion of cradle
18 shell
20 outer ring
22 middle ring
24 inner ring
26 bores
28 fasteners
30 upper rim of cradle
32 semicircle support members of cradle
34 battery box
36 motor supports
38 control surfaces in propulsion system
40 propeller
42 motor
44 bars of shell
46 seat
48 upper hemisphere
50 lower hemisphere
52 connection points

DETAILED DESCRIPTION OF THE PREFERRED EMBODIMENTS

FIG. 1 illustrates an all terrain vehicle 10 essentially comprising a casing 12, a propulsion system 14, a cradle 16 supporting the propulsion system 14, and an outer shell 18.

The casing 12 surrounds the propulsion system 14 and the cradle 16, as illustrated in FIG. 1. The casing 12 comprises a plurality of rings, namely an outer ring 20, a middle ring 22, and an inner ring 24. When the vehicle 10 is in the resting position, the outer ring 20 is positioned horizontally around the entire vehicle 10, thus separating the vehicle 10 into an upper hemisphere 48 and a lower hemisphere 50, and the middle and inner rings 22, 24 extend vertically around the vehicle 10 inside the outer ring 20. Each ring 20, 22, 24 has an outside diameter slightly smaller than the inside diameter of the preceding ring in order to allow free rotation of the individual rings 20, 22, 24 without interference with the other rings. Specifically, the inner ring 24 has a smaller outside diameter than the inside diameter of the middle ring 22, and the middle ring 22 has a smaller outside diameter than the inside diameter of the outer ring 20. This construction also allows the rings 20, 22, 24 to fit within each other.

The rings 20, 22, 24 are each attached to each other at connection points 52, each ring 20, 22, 24 having a rotational perpendicular to adjacent rings. The connection points 52 include bores 26 through which fasteners 28 are inserted to secure the rings 20, 22, 24 together. The middle ring 22 has a first pair of connection points 52, positioned at one hundred eighty (180°) degree intervals thereon, that are aligned with a pair of connection points 52 on the outer ring 20. A second set of connection points 52 are positioned on the middle ring 22, ninety (90°) degrees apart from the first pair of connection points 52. This second pair is aligned with connection points 52 on the inner ring 24. The fasteners 28 at the connection points 52 allow the rings 20, 22, 24 to swivel about the other rings.

Figure 3:
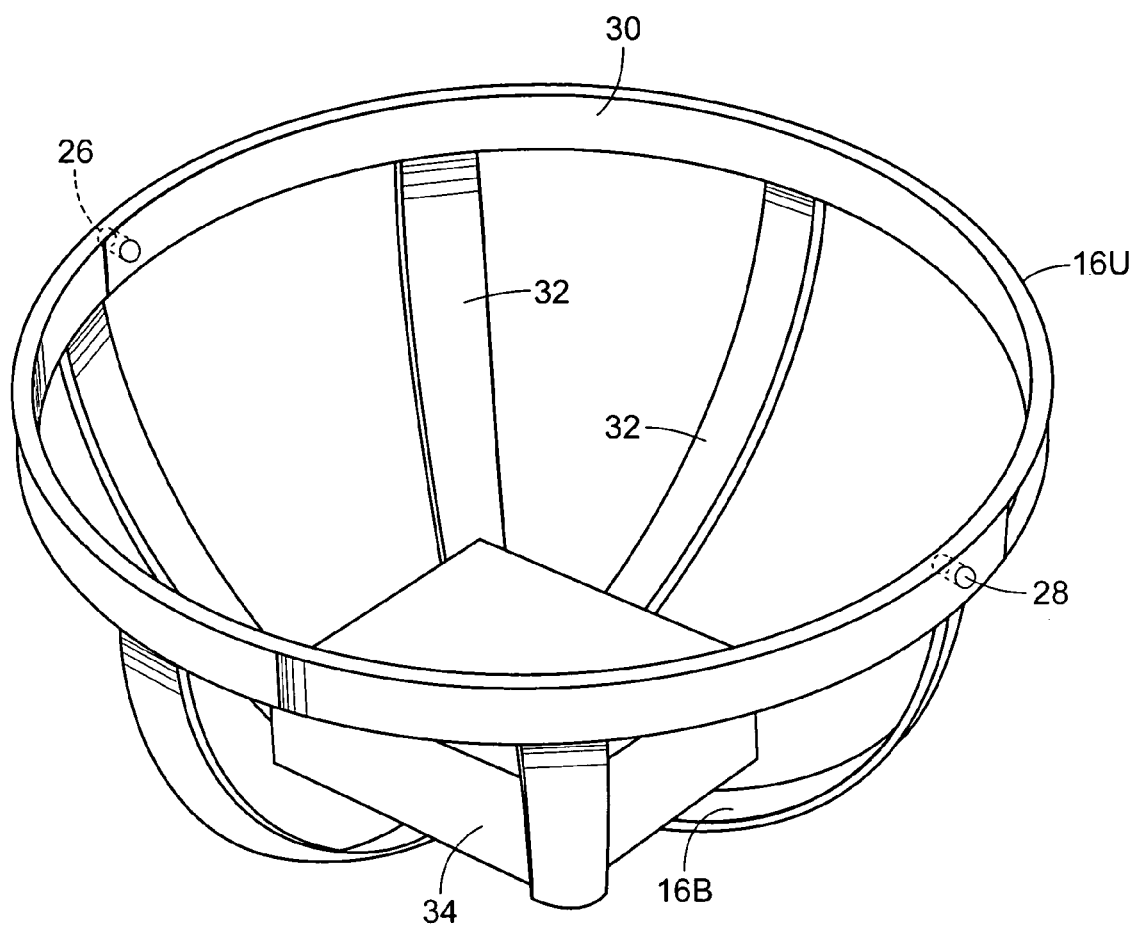
FIG. 3 is a perspective view of the cradle.

The cradle 16 is positioned in the center of the vehicle 10 and attached to the inner ring 24 at a set of connection points 52 positioned ninety (90°) degrees apart from the middle ring connection points. As illustrated in FIG. 3, the cradle 16 comprises an upper rim 30 extending along the upper end 16U, said rim 30 binding a plurality of semicircle support members 32. The support members 32 extend concavely from one side of the rim 30 to the opposite side. A battery box 34 is secured at the bottom portion 16B of the cradle 16 and is in communication with the propulsion system 14. The casing 12 is configured so that when the vehicle 10 is in motion, the rings 20, 22, 24 will rotate as necessary to keep the cradle 16 in a fixed upright position.

Figure 2:
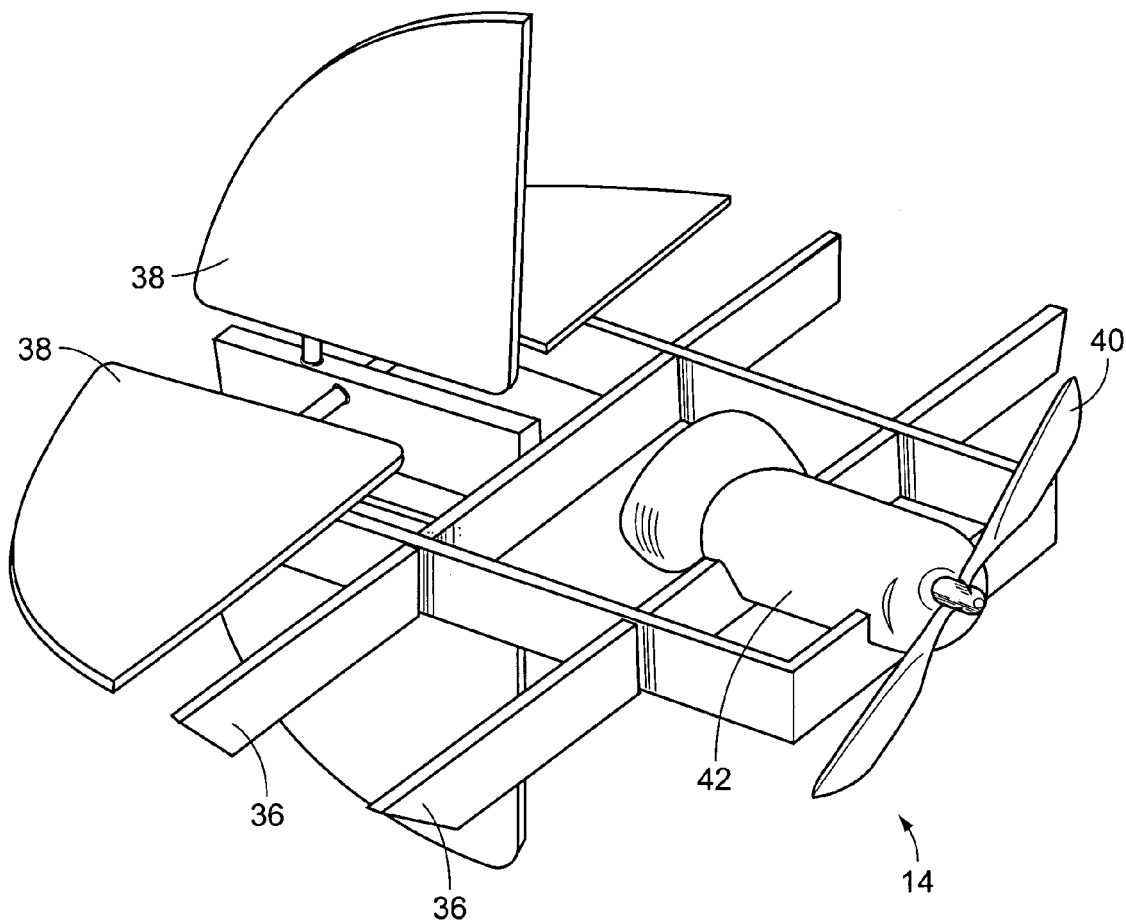
FIG. 2 is a perspective view of the motor assembly.

The propulsion system 14 is mounted within the confines of the cradle 16, on top of the battery box 34. Referring to FIG. 2, the propulsion system 14 comprises a motor 42, motor supports 36, a plurality of control surfaces 38, and a propeller 40 mounted on the motor 42. When the motor 42 is activated by the battery housed in the battery box 34, the propeller 40 will spin, causing thrust to propel the vehicle 10 forward. Four control surfaces 38 are positioned behind the motor 42. The control surfaces 38 are each perpendicular to the others and control the direction of the vehicle 10. The propeller 40 generates thrust which induces forward and backward movement, while the control surfaces 38 control more precise movements of the vehicle 10.

Figure 4:
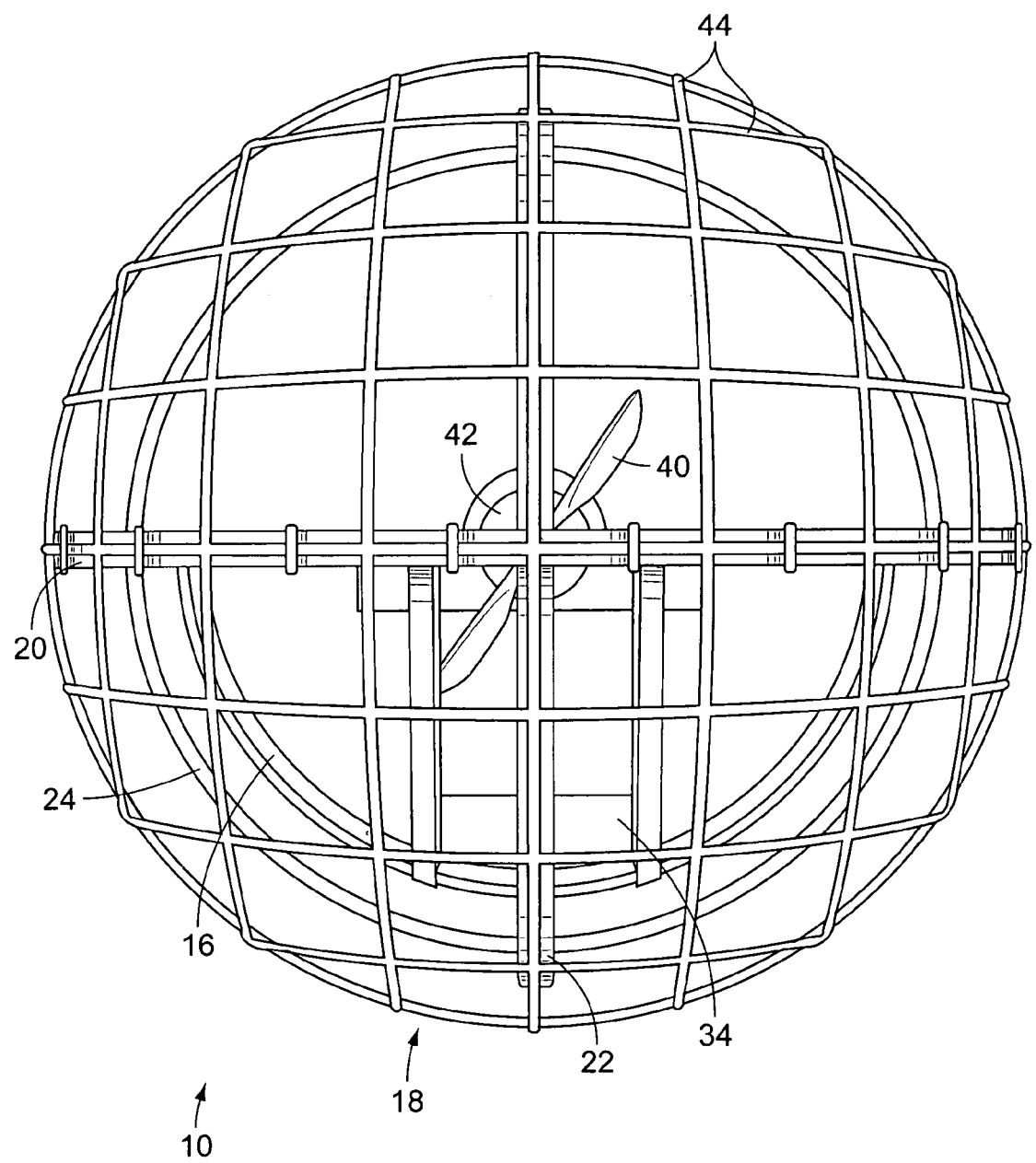
FIG. 4 is a front elevational view of the all terrain vehicle, completely assembled.

As illustrated in FIG. 4, the outer shell 18 encircles the propulsion system 14, cradle 16, and casing 12, and is attached to the outer ring 20. The outer shell 18 is constructed from a plurality of vertical and horizontal bars 44, said bars 44 spaced so as not to significantly impede the flow of air and the propulsive air force therethrough. This configuration creates a protective web around the vehicle 10 to protect the inner components from damage. As the thrust from the propulsion system 14 exits through the shell 18, the outer shell 18 will roll upon a ground surface. However, as previously indicated, the alternating axis rings 20, 22, 24 will ensure that the cradle 16 remains upright, despite the position of the outer shell 18.

Figure 5:
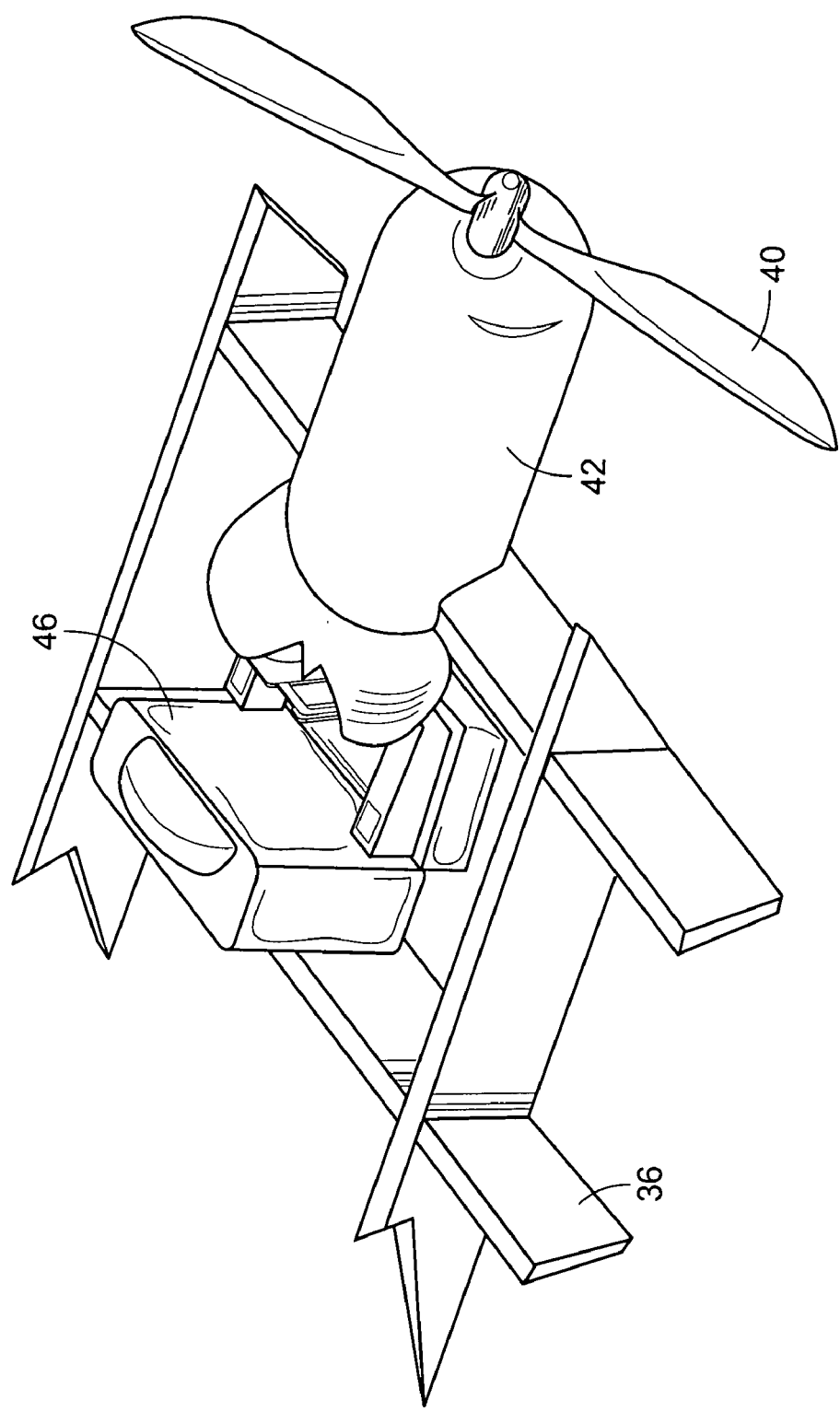
FIG. 5 is a perspective view of the motor assembly, with a seat in place within the assembly.

In an alternate embodiment of the propulsion system 14, as illustrated in FIG. 5, a seat 46 may be inserted between the motor supports 36, behind the motor 42, said seat 46 allowing a human sized driver and/or passenger to ride therein.

In use, the vehicle 10 is capable of movement in all directions over any type of surface. When moving forward, the outer ring 20, along with the connected outer shell 18 rolls along the ground surface. To keep the cradle 16 upright, the middle and inner rings 22, 24 pivot with respect to each other, the outer ring 20 and the cradle 16. When moving in a right or left direction, the inner ring 24 rotates about the middle ring connection points 52, while the middle and outer rings 22, 20 roll with the vehicle 10. Regardless of the direction in which the vehicle 10 travels, the cradle 16 remains in an upright position because of the angular compensation provided by the rings 20, 22, 24 of the casing 12 and the weight of the propulsion system 14 contained therein. Thus, the center of gravity of the propulsion system 14 and the cradle 16 remains below the connection points 52 on the upper rim 30 of the cradle 16.

The all terrain vehicle 10 may be constructed in a variety of sizes to suit different purposes. By way of example, a miniature version may be available for use on a key chain, a larger version may be used as a toy and operated by a remote control device. Lastly, a full sized version, incorporating the seat 46 as mentioned above, may accommodate a person.

In conclusion, herein is presented an all terrain vehicle. The invention is illustrated by example in the drawing figures, and throughout the written description. It should be understood that numerous variations are possible, while adhering to the inventive concept. Such variations are contemplated as being a part of the present invention.

What is claimed is:

1. An all terrain vehicle comprising:
   a casing having an outer ring, a middle ring, and an inner ring, each ring having an axis perpendicular to the adjacent rings, the rings being attached to each other at defined connection points, the middle ring having a first pair of connection points, positioned at one hundred eighty (180°) degree intervals thereon, that are aligned with a pair of connection points on the outer ring, the middle ring also having a second set of connection points, positioned ninety (90°) degrees apart from the first pair of connection points, that are aligned with connection points on the inner ring;
   a cradle positioned in the center of the vehicle, the cradle having an upper portion, a bottom portion, an upper rim extending around the upper portion, and a plurality of semicircle support members attached to the upper rim extending concavely from one side of the rim to the opposite side, said cradle attached to the inner ring at a set of connection points positioned ninety (90°) degrees apart from the middle ring connection points;
   a propulsion system positioned within the cradle for producing a propulsive air force, wherein the weight of the propulsion system maintains the cradle in an upright position during movement of the vehicle; and
   an outer shell extending around the casing and connected to the outer ring, the shell comprising a plurality of vertical and horizontal bars creating a protective web around the vehicle which do not significantly impede the propulsive air force.

2. The all terrain vehicle as recited in claim 1, wherein the inner ring has an outside diameter smaller than the inside diameter of the middle ring, and the middle ring has an outside diameter smaller than the inside diameter of the outer ring, this configuration allowing the rings to fit within each other and rotate freely without interference from the other rings.

3. The all terrain vehicle as receipted in claim 2, wherein the rings each have a bore positioned at each connection point, and a fastener inserted through each bore to attach the rings to each other, said fasteners allowing the rings to swivel at the connection points.

4. The all terrain vehicle as recited in claim 3, wherein the propulsion system comprises a motor, motor supports, a plurality of control surfaces, and a propeller mounted on the motor, wherein the propeller induces forward and backward movement, and the control surfaces control more precise movements of the vehicle.

5. The all terrain vehicle as receipted in claim 4, further comprising a battery box secured to the bottom portion of the cradle, the battery box in communication with the propulsion system.

6. The all terrain vehicle as recited in claim 5, wherein the propulsion system further comprises four control surfaces arranged perpendicular to each other.

7. The all terrain vehicle as recited in claim 6, further comprising a seat positioned within the cradle for supporting an operator or passenger of the vehicle.

8. The all terrain vehicle as receipted in claim 7, wherein the vehicle is operated by a remote control device.

\* \* \* \* \*